United States Patent Office 3,124,255
Patented Mar. 10, 1964

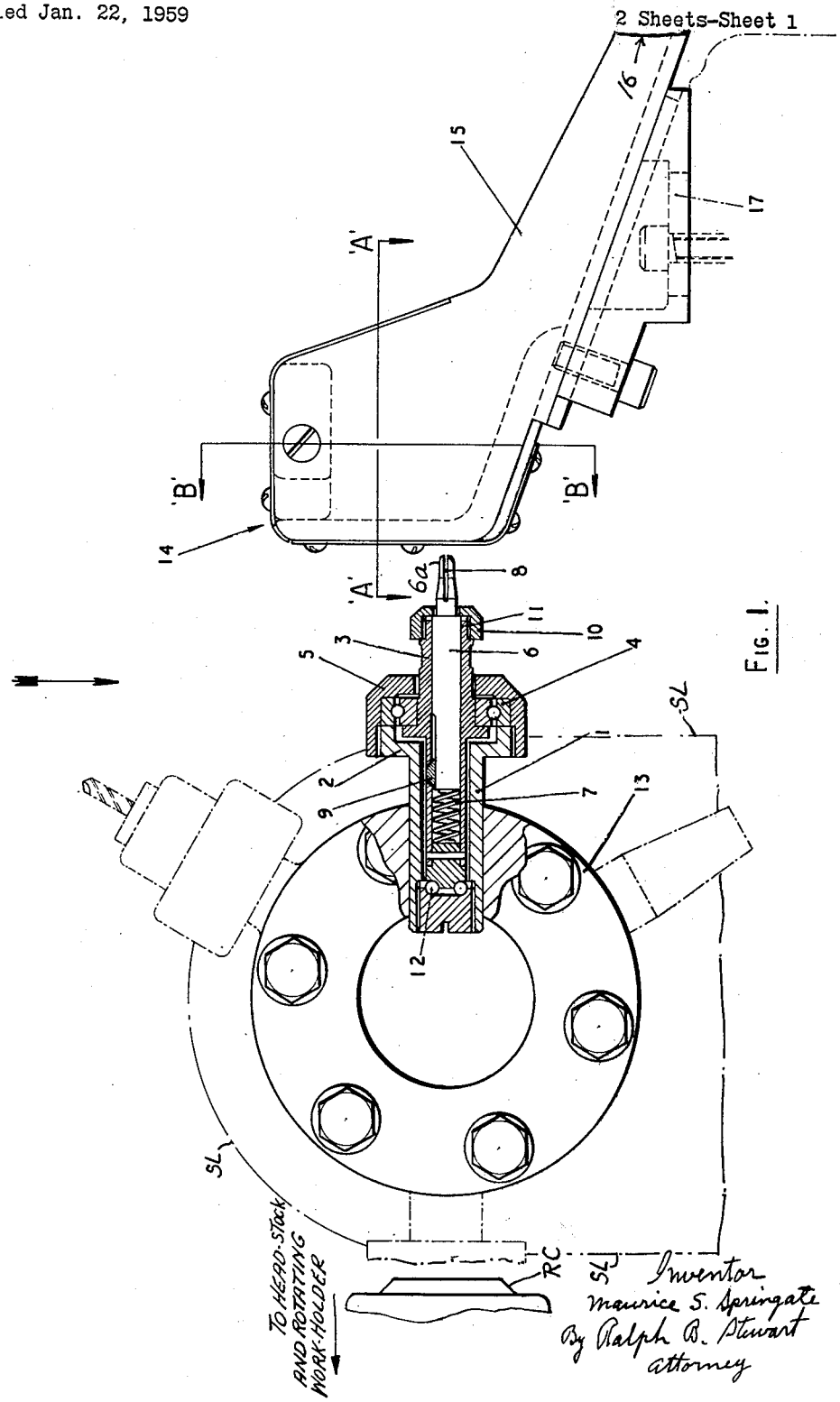

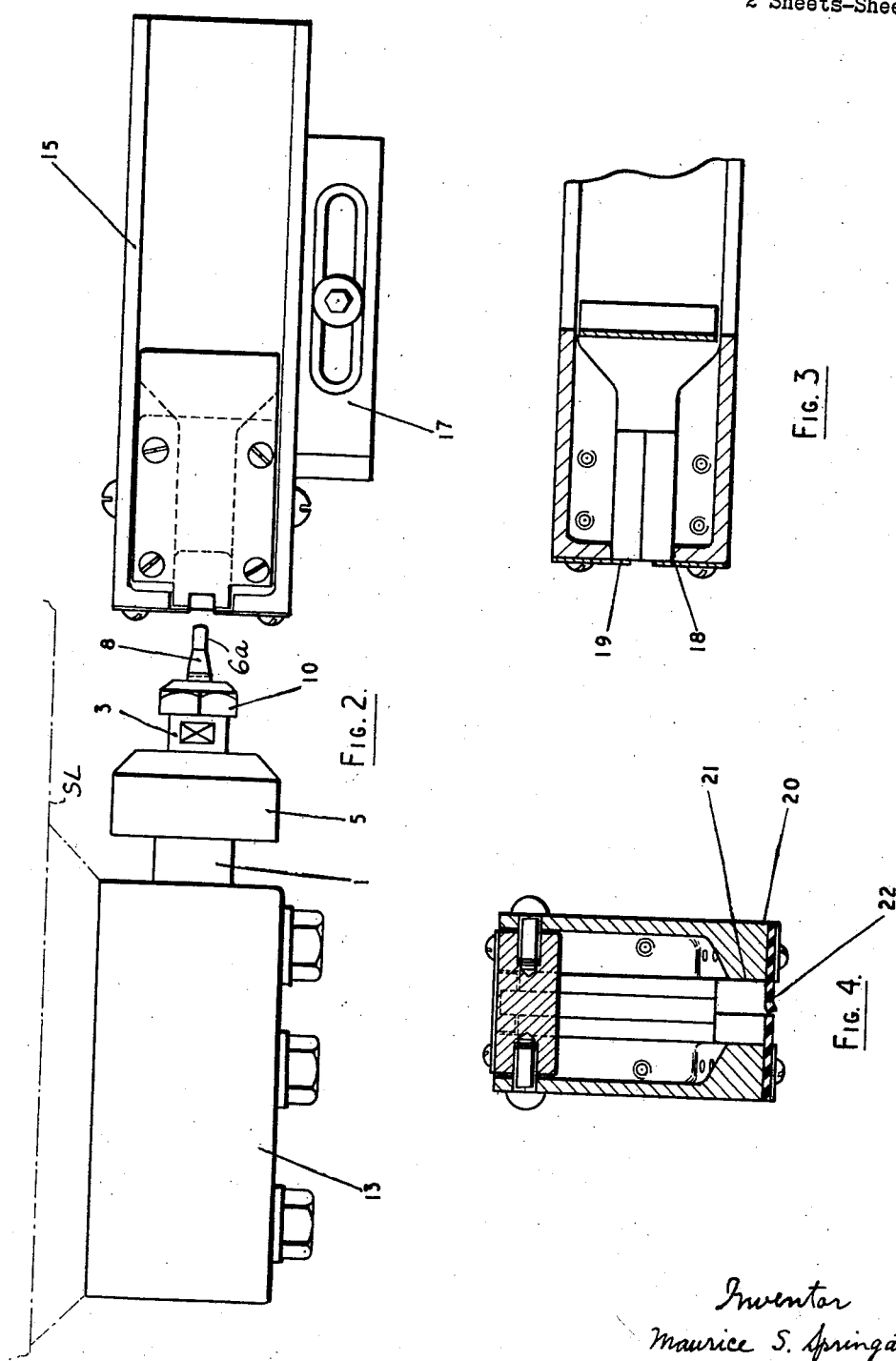

3,124,255
APPARATUS FOR TRANSFERRING WORKPIECES IN MACHINE TOOLS
Maurice Stanley Springate, Oaklands, England, assignor to Aviation Developments Limited, Welwyn Garden City, Herts, England, a company of England
Filed Jan. 22, 1959, Ser. No. 788,413
Claims priority, application Great Britain Jan. 23, 1958
4 Claims. (Cl. 214—1)

This invention relates to apparatus for transferring workpieces in machine tools such as a turret type of lathe. In such machines it is the current practice for the articles to fall with the swarf or chippings as the workpieces are parted off from the stock from which they are formed.

The invention has for an object to provide means for picking up articles as they are parted off and thus preventing them from falling with the swarf.

According to the invention an apparatus for transferring a rotating workpiece from its holder (the stock in the rotating chuck or collet) to a collector, comprises a rotatable finger, means for bringing the finger into alignment with the axis of rotation of the workpiece, means for advancing the finger axially so that it overlaps and grips the workpiece, means for axially withdrawing the finger with the workpiece attached after it has been parted-off from the stock.

In accordance with another feature of the invention the apparatus for transferring a rotating workpiece from its holder to a collector comprises also means for inserting the workpiece into a collector while mounted on said finger and means for disengaging the workpiece from the finger in the collector.

Conveniently the finger is spring loaded axially towards the workpiece.

In accordance with a still further feature of the invention the finger is axially split over a portion of its length so as to be radially compressable and so that it will grip a tubular workpiece internally.

In accordance with another aspect of the invention the finger is in the form of a collet so that it will grip a solid workpiece externally.

A preferred example of the invention will now be described with reference to the accompanying drawings in which:

FIG. 1 is a view in part sectional elevation of an apparatus for transferring workpieces from its holder to a collector according to the invention.

FIG. 2 is a plan view of FIG. 1.

FIG. 3 is a view in section on the line A—A of FIG. 1.

FIG. 4 is a view in section on the line B—B of FIG. 1.

Referring to FIGS. 1 and 2 of the drawing the apparatus for transferring workpieces in machine tools comprises a tubular body 1 formed with an externally screw threaded flange 2 at one end. A partly hollow spindle 3 is rotatably mounted within the body 1 on a journal ball bearing 4 held in position by means of an internally threaded cap 5 which is screwed on to the flange 2. A pick up plunger 6 slideable but not rotatable within the spindle 3 is normally held in the projected position shown by a compression spring 7 housed in the hollow spindle 3. The outer end 6a of the plunger 6 forms the pick-up finger and is slotted at 8 for insertion into the bore of an article to be picked up. The plunger 6 is held against rotation in the spindle 3 by a dovetail key 9 and is held against the spring 7 by a nose cap 10 screwed on to the extension 11 of the hollow spindle 3.

The spindle 3 is free to rotate within the body and is supported at its one end by the ball bearing 4 and at its other end by the thrust race 12. Spindle 3 is mounted to rotate about its own axis so that it will not impose an undue drag on the workpiece while the workpiece is rotating. The tubular body 1 is clamped conventionally (by means not shown) in a socket formed in the turret 13 of the turret type machine of conventional construction, the turret 13 being mounted as usual upon a slide SL which is movable horizontally towards and from the rotating workpiece carried in the rotating work holder or chuck RC of the machine, and the turret being mounted on the slide for turning about a horizontal axis to present different tools to the workpiece. So far as the present invention is concerned, the turret slide may be operated manually, and the turret itself may be stepped from one position to the other manually, or both motions may be accomplished automatically.

Positioned tangentially to the turret 13 is a collector 14 comprising part of an aluminium casting 15 which extends to form a chute 16 for articles removed from the finger 6a. This chute is mounted on a bracket 17 which is screwed to the frame of the machine and is adjustable towards and from turret 13. The face of the casting extending tangentially of the path of movement of finger 6a is vertically slotted at 18 and two stripper spring strips 19 are screwed to the slotted face of the collector 14 (see FIG. 3) at such distance from each other as to give free passage to the finger 6a in the gap between the stripper plates 19, but prevents the article from passing between them when the finger is withdrawn. During the retraction of the plunger 6 by movement of the turret slide these stripper springs 19 engage and remove an article therefrom and retain it in the chute 16. A base 20 of the casting 15 is slotted or notched at 21 lengthwise and in line with the gap between plates 19, and the notch is normally closed by two oil resisting rubber flaps 22 secured to the base 20 with their longitudinal edges abutting each other. In use the tubular body 1 of the apparatus for transferring a rotating workpiece from its holder (not shown) is clamped in the turret 13 on which are mounted five other tools. In this turret type machine each tool by movement of slide SL is successively advanced on the work and retracted after completing its operation upon which the turret 13 is rotated on its mounting axis by one step of 60°. The turret 13 is advanced towards the rotating chuck RC and retracted therefrom by movement of the slide SL in the usual manner. When the work such as a hollow rivet is to be parted off from the stock which is held in the holder or chuck in the turret machine the slide SL moves towards the chuck RC and the finger 6a of the transferring apparatus enters the bore of the rotating rivet and engages it in overlapping gripping engagement whilst the rivet is still in the chuck RC and is being rotated by the chuck. At this time the transfer apparatus is positioned 180° from the position shown in FIGURE 1, at the location shown in broken lines at 1'. As the turret 13 retracts from the head stock of the machine and indexes for the subsequent operation, the rivet carried by the finger 6a is moved through a half revolution of the turret into the position shown in solid lines in FIGURE 1. During this half revolution of the turret, or prior to such turning, the turret support also moves to the right and moves the transfer apparatus to its advanced position so that the finger 6a with the rivet on it may enter the collector 14 from underneath by deforming the rubber flaps 22 and passing through the thus enlarged slits, whereupon the rubber flaps 22 reassume their initial position with their abutting edges sufficiently closed to retain a removed rivet in the chute.

Finally the turret 13 reaches a position when the article on the finger 6a is behind the stripper springs 19 disposed like adjacent prongs of a fork which act as removal members and engage and retain the article as the plunger 6 is withdrawn by the forward movement of the slide SL carrying the turret 13.

In the case of tubular articles which are drilled out by the tools on the turret, the freely rotatable pick up tool is adapted to engage the interior of the article being picked up and may be capable of yielding against spring influence during advancement by the turret head mechanism so that it will not pick up and carry away an article which for any reason has not been drilled as required.

While this type of feed can be adapted to pick up almost any type of tubular product, it could also be made to pick up solid parts if the pick up finger was made tubular for example in the form of a collet to engage them externally instead of internally.

The rotating part of the apparatus which is instrumental in the picking up workpiece and transferring them to the collector 14 is in the appended claims referred to as the finger.

The rotating finger of the tool or apparatus overlaps or grips the workpiece while it is still in its holder or chuck.

I claim:

1. In a machine tool having a rotary work-holder for holding and rotating a workpiece while machining operations are performed thereon and a slide which is movable towards and away from said rotary work-holder, apparatus for transferring a workpiece from said rotary work-holder comprising, a gripping finger having an end portion formed of resiliently mounted parts for gripping said workpiece when the finger is moved into overlapping engagement with the workpiece, a turret supporting said finger on said slide with its longitudinal axis coincident with the axis of rotation of the workpiece and with said gripping portion directed towards said workpiece, said turret supporting said finger for rotation with respect to said slide and including means supporting said finger for free rotation about its longitudinal axis when engaging a workpiece carried by said rotating work-holder, said slide being movable towards said work-holder to effect overlapping gripping engagement of said finger with said workpiece while said workpiece is being rotated by said work-holder and to retain said workpiece on said finger after the workpiece is released from said work-holder, and workpiece disengaging means disposed in the path of movement of the finger as it rotates about the axis of the turret and being operative to strip the workpiece from said finger.

2. Apparatus as claimed in claim 1, wherein the finger is axially slidable in its mounting on said turret, and including a spring pressing said finger axially towards the rotating workpiece, said spring being of sufficient strength to press said finger into overlapping gripping engagement with said workpiece, but being compressed by said finger when movement of the finger is obstructed.

3. In a machine tool having a rotary work-holder for holding and rotating a workpiece while machining operations are performed thereon and a slide which is movable towards and away from said rotary work-holder, apparatus for transferring a workpiece from said rotary work-holder comprising, a gripping finger having an end portion formed of resiliently mounted parts for gripping said workpiece when the finger is moved into overlapping engagement with the workpiece, a turret supporting said finger on said slide with its longitudinal axis coincident with the axis of rotation of the workpiece and with said gripping portion directed towards said workpiece, said turret supporting said finger for rotation with respect to said slide and including means supporting said finger for free rotation about its longitudinal axis when engaging a workpiece carried by said rotating work-holder, said slide being movable towards said work-holder to effect overlapping gripping engagement of said finger with said workpiece while said workpiece is being rotated by said work-holder and to retain said workpiece on said finger after the workpiece is released from said work-holder, and workpiece disengaging means disposed in the path of movement of the finger as it rotates about the axis of the turret and being operative to strip the workpiece from said finger, said workpiece disengaging means comprising a collector having a wall facing said turret and arranged tangentially of the path of movement of said finger, said wall having a gap formed therein of width a little greater than the finger but less than the workpiece, and means for withdrawing the finger axially through the gap so that if a workpiece is attached to the finger, the workpiece is removed from the finger.

4. Apparatus as claimed in claim 3, wherein the gap in the collector through which the workpiece is introduced is closed by yieldable doors opening inwardly of the collector.

References Cited in the file of this patent

UNITED STATES PATENTS

| | | |
|---|---|---|
| 1,362,286 | Gerhardt | Dec. 14, 1920 |
| 1,839,438 | Prussing | Jan. 5, 1932 |
| 1,958,846 | Christensen | May 15, 1934 |
| 2,334,272 | Mariotte | Nov. 16, 1943 |
| 2,605,538 | Cuttat | Aug. 5, 1952 |
| 2,674,398 | Courtney | Apr. 6, 1954 |
| 2,906,003 | Lakens | Sept. 29, 1959 |

FOREIGN PATENTS

| | | |
|---|---|---|
| 322,360 | Germany | May 23, 1919 |